G. J. MARTEL.
TIRE PATCHING DEVICE.
APPLICATION FILED JUNE 29, 1910.

979,525.

Patented Dec. 27, 1910.

2 SHEETS—SHEET 1.

Witnesses:
E. E. Wessels
A. A. Olson

Inventor:
Gustave J. Martel,
By Joshua R. H. Potts
his Attorney.

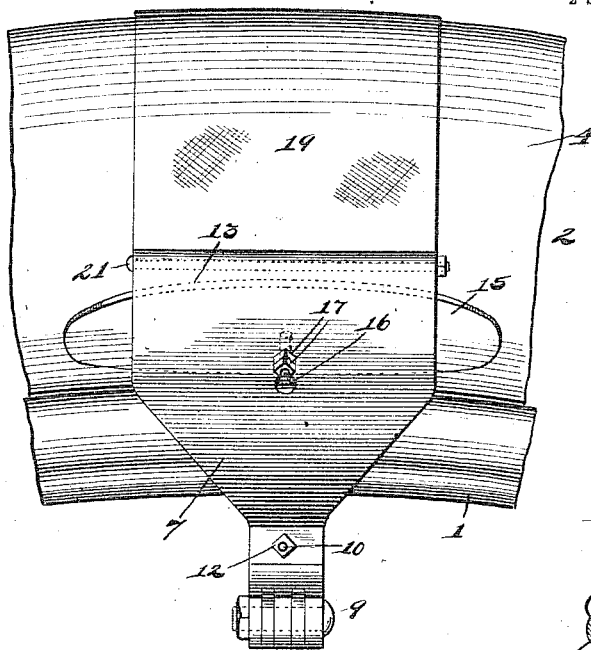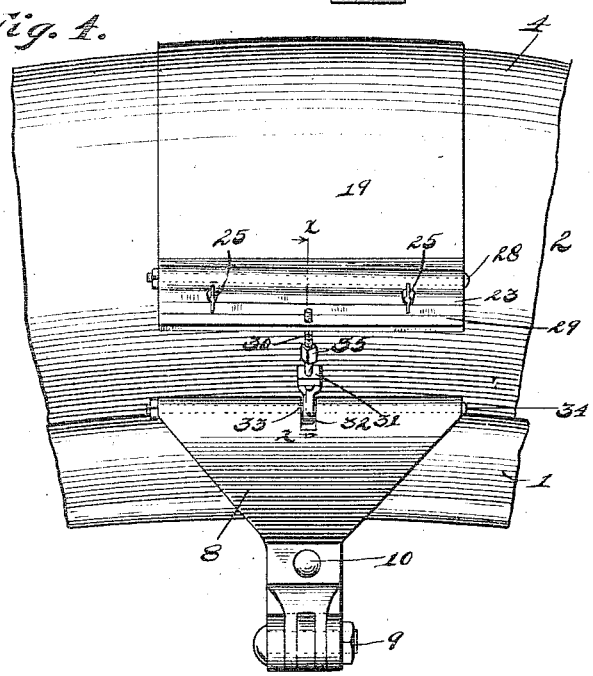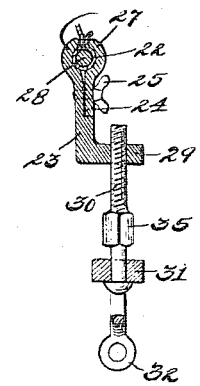

UNITED STATES PATENT OFFICE.

GUSTAVE J. MARTEL, OF CHICAGO, ILLINOIS.

TIRE-PATCHING DEVICE.

979,525.

Specification of Letters Patent.　Patented Dec. 27, 1910.

Application filed June 29, 1910. Serial No. 569,448.

To all whom it may concern:

Be it known that I, GUSTAVE J. MARTEL, a citizen of the United States, residing at Chicago, county of Cook, and State of Illinois, have invented certain new and useful Improvements in Tire-Patching Devices, of which the following is a specification.

My invention relates to blow-out patching devices for pneumatic tires and has for its object the production of a tire attachment of this character which will be adapted for ready attachment to or detachment from a tire, and which will be adapted when attached to effectually serve to reinforce the tire at the point of rupture.

A further object is the provision of a tire patch which will be of durable and economical construction and efficient in operation.

Other objects will appear hereinafter.

With these objects in view my invention consists in a tire patching device characterized as above mentioned and in certain details of construction and arrangement of parts all as will be hereinafter fully described and more particularly pointed out in the appended claims.

Figure 1:
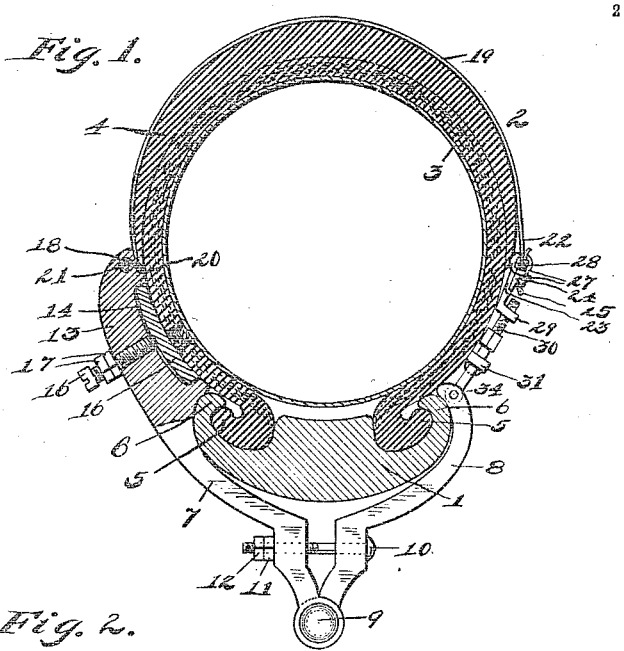
Figure 2:
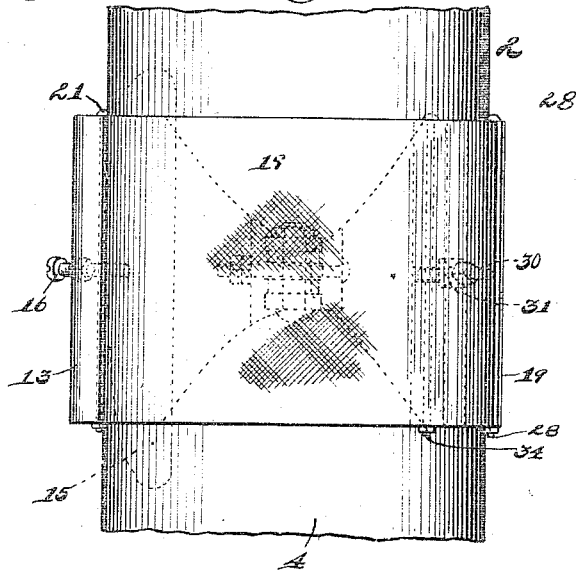

My invention will be more readily understood by reference to the accompanying drawings forming a part of this specification, and in which, Figure 1 is a transverse section of a rim and a pneumatic tire mounted thereon to which is applied a blow-out patching device embodying the preferred form of my invention, a portion of the patching device being shown in section, Fig. 2 is a top plan view of a fragment of the tire bearing the patching device, Figs. 3 and 4 are respectively elevations of the outer and inner sides thereof, and Fig. 5 is an enlarged central transverse section of a portion of the construction shown in Fig. 4, the same being taken on substantially line x—x of said figure.

Referring now to the drawings, 1 indicates the rim of an ordinary pneumatic vehicle wheel and 2 the tire mounted thereon. Said tire consists, as indicated, of an inner air tube 3 and a tire casing 4, the latter being provided at its longitudinal edges with attaching beads 5 which are engaged by corresponding inwardly extending gripping flanges 6 provided at the peripheral edges of the rim, and whereby said casing is securely held or clenched upon the latter.

7 and 8 indicate clamping arms which are pivotally connected at their inner ends by a pin 9 forming a knuckle joint between the same. The outer ends of said arms are flared or divergently formed and are so designed as to adapt the same for snug engagement or to embrace the peripheral edges of the rim 1 upon which the same may be securely clamped through the medium of a bolt 10, the latter extending through alining perforations in said arms and a nut 11 threaded upon said bolt, 12 indicating a lock nut. The arm 7 which is positioned at the outer side of the tire is formed at its outer end with an extension 13. The inner side of said extension is formed with a transversely extending shallow recess 14 in which is seated a snugly fitting elongate metallic plate 15 which is adapted to rest against the tire casing, the inner side of said plate being of a conformation corresponding with that of said casing. Said plate is adapted to be forced into close engagement with the tire casing by means of a set-screw 16 which is threaded into the arm 7 at a substantially central point therein.

17 indicates lock nuts threaded upon the screw 16 through the medium of which the latter and hence the plate 15 may be held in any position of adjustment. The outer edges of said plate at the extremities thereof are, as shown in Fig. 3, preferably rounded so that in the event of a sudden deflection of the tire the car or vehicle will not be subjected to excessive jarring because of the contacting of said extremities of said plate with the ground.

The plate 15 it will be observed is adapted for positioning over the zone in the tire in which blow-outs, as is known by those familiar with tires of this character, invariably occur. With this arrangement, a blow-out or rupture in the tire in this locality may be covered by the plate 15, the latter, through the medium of the screw 16 being adapted to be forced tightly against the tire, as clearly shown in Fig. 1.

At the upper extremity of the member 7 at the inner side thereof is provided a transversely extending recess 18 of a substantially key-hole form in cross section.

19 indicates a patching band which is formed of any durable flexible material such as leather, fiber or textile. The end 20 of said band is buckled and is inserted into said recess, the same being securely held therein by means of a pin 21 which extends through the loop in said band. With this arrangement it will be seen that drawing upon said band effects the wedging of the pin 21 into the contracted outer end portion of the recess 18 and consequently the firm securing of said end of the band therein. With this construction the greater the pull upon said band the more firm will be the gripping of the end 20 thereof in the recess 18. The opposite end 20 of said band is rigidly secured in a clamp device consisting of an angular body plate 23 and a movable jaw-forming plate 24, the latter being adjustably secured to said body plate by means of thumb-screws 25 which pass through the member 24 and are threaded into the member 23. The outer ends 27 of said members 23 and 24 are formed to constitute gripping jaws between which may be clamped the end 22 of the patching band. In order to insure a firm locking of the band between said jaws the end 22 thereof is looped around a removable pin 28 which is held between said jaws, said pin, as will be observed, serving in the same capacity as the pin 21 before described.

In the angular base portion 29 of the member 23 is centrally threaded the upper end portion of a screw 30, the lower end of the latter being in swiveled connection with the upper end of a swivel 31. The lower end of the latter, which is formed into an eye 32 engages a slot 33 formed substantially centrally in the upper edge of the clamp arm 8, the same being swingingly secured to the latter by means of a pin 34 extending transversely through said arm and through the eye 32. The screw 30 adjacent its lower extremity is formed with a squared portion 35 whereby the same may be readily turned by a wrench. With the arrangement disclosed and with the extremity of the patching band secured as indicated it will be seen that in order to effect the tightening of the band about the tire it is only necessary to positively rotate the screw 30, and to loosen the same to rotate said screw in an opposite direction.

With a patching device of a construction as set forth then it will be observed that through the plate 15 provision is made for a positive reinforcement of the tire in the immediate vicinity of the blow-out, and that, through the patching band 19 reinforcement of the entire circumference of the tire in the locality of the rupture is effected. The device may be readily and quickly attached or detached, the same is of strong, durable and economical construction and is of highest efficiency in operation.

While I have shown what I deem to be the preferable form of my device I do not wish to be limited thereto as there might be various changes made in the details of construction and the arrangement of parts described without departing from the spirit of the invention comprehended within the scope of the appended claims.

Having described my invention what I claim as new and desire to secure by Letters Patent is:

1. The combination with a pneumatic tire and a rim, of a tire patching device comprising two pivotally connected clamping arms adapted to clampingly embrace said rim, a plate adapted for arrangement against the exterior surface of said tire, one of said arms engaging said plate for securely holding the same in position upon said tire, and means in said arm for forcing said plate into close engagement with said tire, substantially as described.

2. The combination with a pneumatic tire and a rim, of a tire patching device comprising two pivoted clamping arms adapted to clampingly embrace said rim, means for forcing said arms into clamping engagement with said rim, a plate adapted for arrangement against the exterior surface of said tire adjacent said rim, one of said arms engaging said plate for holding the same in position upon said tire, and a set screw threaded into said arm for forcing said plate into close engagement with said tire, substantially as described.

3. The combination with a pneumatic tire and a rim, of a tire patching device comprising two pivotally connected clamping arms adapted to clampingly embrace said rim, means for forcing said arms into clamping engagement with said rim, a plate adapted for arrangement against the exterior surface of said tire adjacent said rim, one of said arms engaging said plate for holding the same in position upon said tire, means in said arm for forcing said plate into close engagement with said tire, and a flexible band adapted to extend around the outer portion of said tire, the respective ends of said band being connected with the outer ends of said arms, substantially as described.

4. The combination with a rim and a pneumatic tire mounted thereon, of a tire patching device comprising two pivotally connected clamping arms adapted to clampingly embrace said rim, means for forcing said arms into clamping engagement with said rim, a plate adapted for arrangement against the exterior surface of said tire, one of said arms engaging said plate for holding the same in position upon said tire, means for forcing said plate into close engagement with said tire, a flexible band adapted to encircle said tire, and means connecting the respective ends of said band to the outer ends of said arms for tightening said band around said tire after the clamp is secured in position, substantially as described.

5. The combination with a rim and a pneumatic tire mounted thereon, of a tire patching device comprising two pivotally connected clamping arms adapted to clampingly embrace the rim of said tire, means for forcing said arms into clamping engagement with said rim, a flexible band adapted to extend around the tread portion of said tire, one end of said band being connected to one of said clamping arms, and adjustable means connecting the other end of said band and the other end of said arms whereby said band may be drawn tightly around said tire, substantially as described.

6. The combination with a rim and a pneumatic tire mounted thereon, of a tire patching device comprising two pivotally connected clamping arms adapted to clampingly embrace said rim, adjustable means for forcing said arms into clamping engagement with said rim, a plate adapted for arrangement against the outer side of said tire adjacent said rim, one of said arms being extended to adapt the same for holding said plate in position upon said tire, a screw threaded into said arm and engaging said plate for forcing the latter into close engagement with said tire, a flexible band adapted to encircle the tread portion of said tire, one end of said band being connected to one of said clamping arms, and adjustable means connecting the other end of said band to the other of said arms whereby said band may be drawn tightly around said tire, substantially as described.

7. The combination with a rim and a pneumatic tire mounted thereon, of a tire patching device comprising two pivotally connected clamping arms adapted to clampingly embrace the peripheral edges of said rim, means connecting said arms for forcing the same into clamping engagement with said rim, a plate adapted for arrangement against the side of said tire, one of said arms being extended to adapt the same for holding said plate in position upon said tire, a recess in said arm forming a seat for said plate, a screw threaded into said arm and engaging with said tire, a flexible band adapted to encircle the tread portion of said tire, a detachable connection between one end of said band and one of said arms, a clamp engaging the other end of said band, and a screw connection between said clamp and the other of said arms whereby said band may be drawn tightly around said tire, substantially as described.

In testimony whereof I have signed my name to this specification in the presence of two subscribing witnesses.

GUSTAVE J. MARTEL.

Witnesses:
HELEN F. LILLIS,
JOSHUA R. H. POTTS.